US009100534B2

(12) United States Patent
Eskilsson

(10) Patent No.: US 9,100,534 B2
(45) Date of Patent: Aug. 4, 2015

(54) VIDEOCONFERENCING SYSTEM USING AN INVERTED TELESCOPE CAMERA

(75) Inventor: Erik Eskilsson, Solna (SE)

(73) Assignee: Mebe Viewcom AB, Solna (SE)

( * ) Notice: Subject to any disclaimer, the term of this patent is extended or adjusted under 35 U.S.C. 154(b) by 109 days.

(21) Appl. No.: 14/126,530

(22) PCT Filed: Jun. 15, 2012

(86) PCT No.: PCT/SE2012/050656
§ 371 (c)(1),
(2), (4) Date: Feb. 13, 2014

(87) PCT Pub. No.: WO2012/173564
PCT Pub. Date: Dec. 20, 2012

(65) Prior Publication Data
US 2014/0225979 A1    Aug. 14, 2014

(30) Foreign Application Priority Data

Jun. 15, 2011 (SE) ..................................... 1150537

(51) Int. Cl.
*H04N 7/15* (2006.01)
*H04N 7/14* (2006.01)

(52) U.S. Cl.
CPC .............. *H04N 7/142* (2013.01); *H04N 7/144* (2013.01); *H04N 7/15* (2013.01)

(58) Field of Classification Search
CPC ......... H04N 7/144; H04N 7/15; H04N 7/152; H04N 7/14
USPC ................................ 348/14.01–14.16; 353/73
See application file for complete search history.

(56) References Cited

U.S. PATENT DOCUMENTS

| 5,703,726 A | 12/1997 | Griffith |
| 6,008,951 A | 12/1999 | Anderson |
| 8,976,219 B2 * | 3/2015 | Eskilsson .................. 348/14.07 |

(Continued)

FOREIGN PATENT DOCUMENTS

| EP | 2 290 969 A1 | 3/2011 |
| WO | 2004/064399 A1 | 7/2004 |

(Continued)

OTHER PUBLICATIONS

International Search Report for corresponding International Application No. PCT/SE2012/050656 dated Oct. 18, 2012.

*Primary Examiner* — Melur Ramakrishnaiah
(74) *Attorney, Agent, or Firm* — Renner, Otto, Boisselle & Sklar, LLP

(57) ABSTRACT

The present invention relates to a system for life-size video conferencing provided in studio having a local conferee space (100). The video conferencing system comprises an optical input unit (30), an optical output unit (40), a screen (60), a network unit (34) and a transparent barrier (38). The transparent barrier (38) is arranged to seal and protect the video conferencing system from the local conference space (100) and the screen (60) is provided skewed, with an angle a in relation to the optical output unit (40), between the transparent barrier (38) and the optical output unit (40) in such a way that it totally reflects the image (31) of the local conference space into the optical input unit (30) and is transparent for a conferee sitting in the local conference space (100) and viewing the optical output unit (40). The optical input unit (30) is a camera provided with a lens system in form of an inverted telescope.

7 Claims, 3 Drawing Sheets

(56) References Cited

U.S. PATENT DOCUMENTS

| | | |
|---|---|---|
| 2003/0174292 A1* | 9/2003 | White .............................. 353/74 |
| 2005/0099605 A1 | 5/2005 | Buchner |
| 2006/0050398 A1 | 3/2006 | Gurevich et al. |
| 2007/0086087 A1 | 4/2007 | Dent et al. |
| 2009/0135245 A1 | 5/2009 | Luo et al. |
| 2010/0253761 A1* | 10/2010 | White ........................ 348/14.16 |

FOREIGN PATENT DOCUMENTS

| | | |
|---|---|---|
| WO | 2008/036931 A2 | 3/2008 |
| WO | 2011/152771 A2 | 12/2011 |

* cited by examiner

VIDEOCONFERENCING SYSTEM USING AN INVERTED TELESCOPE CAMERA

This application is a national phase of International Application No. PCT/SE2012/050656 filed Jun. 15, 2012 and published in the English language, which claims priority to Application No. SE 1150537-7 filed Jun. 15, 2011.

TECHNICAL FIELD

The present invention relates to an improved life-size videoconferencing system.

BACKGROUND

The use of videoconferencing has steadily increased over the years. It is not only environmental friendly but also saves valuable time for the participating conferees, that otherwise would have to travel from a remote location. Thus, videoconferencing has substituted many "real life" meetings due to said advantages.

This trend has further accelerated since it is commonplace with dedicated conference rooms in the corporate world. The high value of a comfortable and well functioning conference setting is appreciated, and these premises are relatively spacious and always well-equipped both in terms of service, technology and design. Videoconferencing may be set up with an external party, but more importantly, the external party may be participating on site. Therefore it is important to be able to convey the "look and feel" of the corporate identity regardless of whether the external party is talking to a corporate officer on site or a corporate officer at a remote site. Despite this fact, previous attempts to create videoconferencing systems fail to exploit the advantages of being able to realistically render the remote environment along with the remote conferee, this even though some solutions actually do acknowledge the advantage of the remote conferees appearing in a standardized setting.

One of the biggest disadvantages with the videoconference systems on the market today is the lack of ability to create "real" eye contact between the conferees. To be able to create "true" eye contact is very important in order to eliminate the irritation and frustration that otherwise may occur if an important negotiation is to be performed. This is due to a so called false eye-contact phenomenon, which is illustrated in FIG. 1. In FIG. 1 conferees A, B, and C on the left hand side are in videoconference with conferees D, E and F on the right hand side. Each side has a display surface along the interface 10. Behind each display is a camera. When conferee D watches conferee A on the display conferee A will experience that conferee D is watching somewhat to the left of him/her. Furthermore if E, or for that matter D or F, look at B, i.e. straight towards the camera, everybody on he left hand side will perceive E as looking straight at him/her personally. If E then asks a question, A, B and C will try to answer all at once. Thus, in order to be able carry out sensitive negotiations in a videoconference setting rather than in "real life" it is important to eliminate the eye contact phenomenon.

One solution to the above problem is shown in the PCT-Application SE2011/050064 with the same applicant as the present invention. Said application is hereby incorporated by reference. In this application there is disclosed a studio, a studio configuration and a calibration method for life-size videoconferencing. The main purpose is to create standardized studios equipped with a standardized calibrated videoconference system. By doing so it is possible to show the entire local conference space of the studio to scale and without aberrations to a remote conference space. Thus, a local conferee may establish eye contact and register the body movements of a remote conferee.

In one embodiment of this system mirrors are used to increase the optical distance from the local conference space to the camera used to record said conference space. This is an important feature of the videoconference system since an increased distance will reduce the parallax angle. This may best be described by thinking of a close up image of a person's face. In such an image the nose of the person will look disproportional big compared to the rest of the face. This is a well known problem. In a studio or a conference room were space is almost always limited this problem is not easy to correct.

Also WO 2008/036931 discloses a videoconference using a two-way mirror to create an optical path that is longer than the physical distance between a user and a camera.

The use of mirrors is one solution to the problem, but may be very complicated if one is to use more than one mirror in order to further increase the optical distance. Thus there is a need for a videoconference system that despite limited space is able to further reduce the parallax error.

SUMMARY

The objective of the present invention is to reduce the parallax phenomenon in such a way that a user of the videoconference system experiences a "true" and life-size image even if the conference space is limited.

According to an aspect of the present invention the objective is achieved by a videoconference system for life-size videoconferencing provided in a studio having a local conference space. The videoconference system comprises an optical input unit, an optical output unit and a network unit. The optical input unit is a camera provided with an image forming system in form of an inverted telescope through which visible light of objects to be filmed travel to create images.

According to a preferred embodiment of the videoconferencing system the network unit further comprises a processing unit for enlarging and enhancing the brightness of the created images.

According to another embodiment the videoconferencing system further comprises a screen and a transparent barrier. The transparent barrier is arranged to seal and protect the video conferencing system from the local conference space and the screen is provided skewed, with an angle $\alpha$ in relation to the optical output unit, between the transparent barrier and the optical output unit in such a way that it totally reflects the image of the local conference space into the optical input unit and is transparent for a conferee sitting in the local conference space and viewing the optical output unit.

According to a preferred embodiment of the present invention the angle $\alpha$ is in the range of 30-45°, preferably 37°.

According to another preferred embodiment a mirror is arranged to reflect the image of the local conference space into the camera.

According to yet another embodiment of the present invention the transparent barrier is a surface foiled polyester film.

BRIEF DESCRIPTION OF THE DRAWINGS

In order to explain the invention in more detail an embodiment of the present invention will be described in detail below, reference being made to the accompanying drawings, in which.

DETAILED DESCRIPTION

As is mentioned above it is the objective of the present invention to enable realistic impression of conferees in different physical locations participating in the same operational conference setting, so that every conferee experiences the apparent presence of every other conferee. This objective includes enabling remote conferees to clearly see not only the local conferees, but also local objects in the periphery of the local studio.

Figure 1:
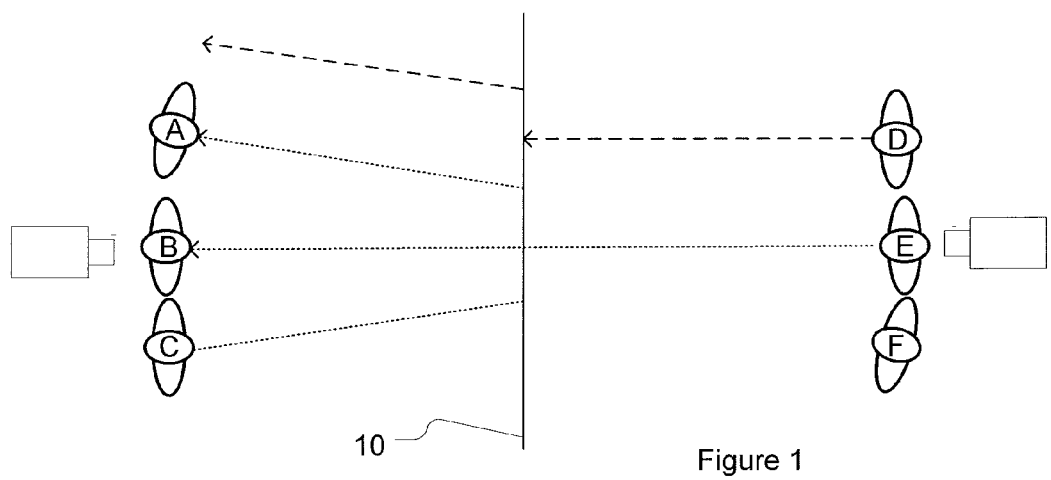
FIG. 1 is shows the lack of eye contact in a prior art system.
Figure 2A:
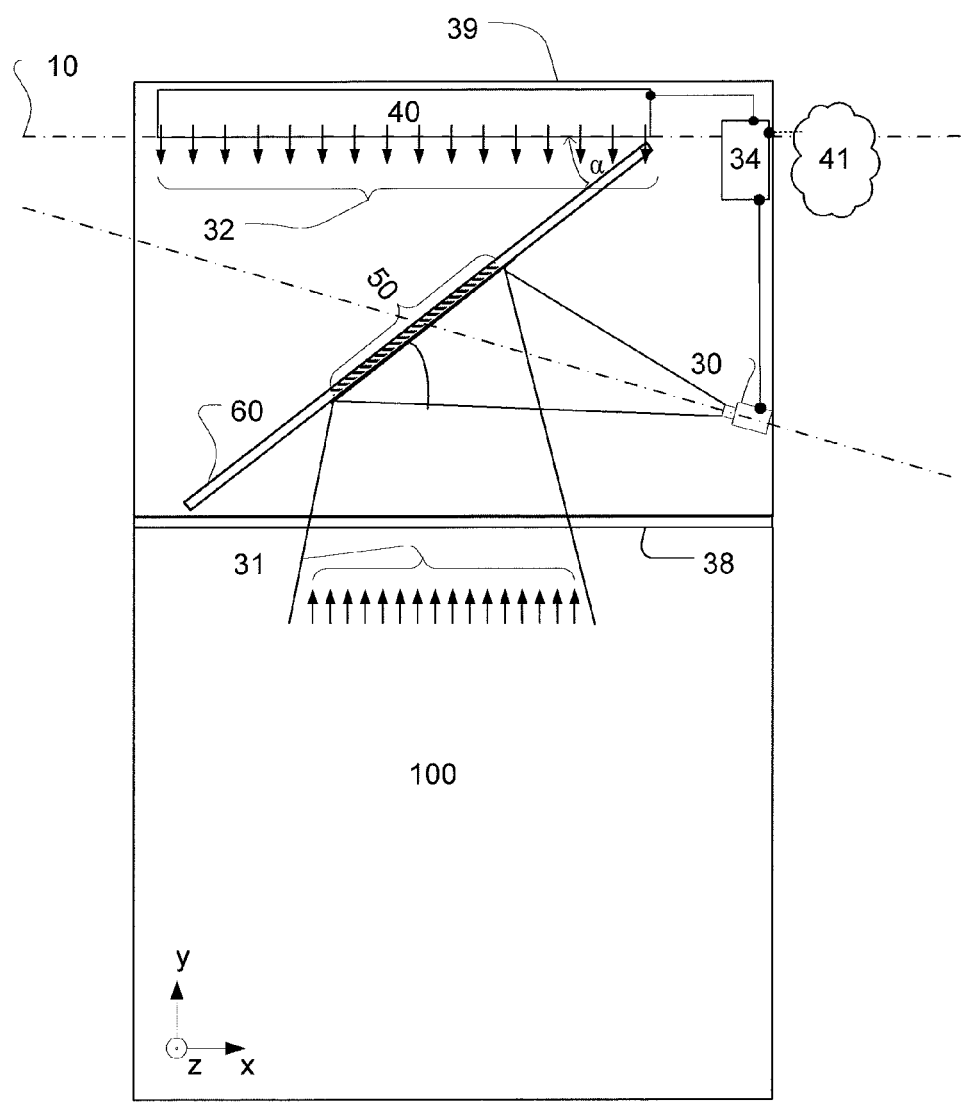
FIG. 2a is a schematic view of a first embodiment of the videoconference system and the local conference space.

FIG. 2a shows a schematic view of a first embodiment of the videoconference system and the local conference space 100 provided in a studio according to the present invention. The videoconference system comprises an input unit 30, an output unit 40 and a screen 60. The videoconference system is protected and sealed by a transparent and protective barrier 38. The transparent barrier 38 may comprise an antireflection coated pane of e.g. glass. The transparent barrier 38 protects the videoconference system from being tampered with by conferees present in the local conference space 100. This is a very important feature, since the setting of and interrelation between the screen 60, the optical input unit 30 and the optical output unit are of great importance in order to achieve a videoconference system that is capable to show natural life-size images. Thus, the transparent barrier 38 allows that components fixed, installed and configured according to a predetermined design will remain within the same distances, angles and aspects as intended. The setting and the calibration of a videoconference system in a studio depends on many different variables and it is believed to within capabilities of a person skilled in the art to set up such a videoconference system. For example, the above referenced PCT-application SE2011/050064 of the present applicant describes thus the setting of a videoconference system in a studio and a calibration method therefore. Another benefit with sealing the videoconference system with the transparent barrier 38 is that variation in air pressure will not effect the position of the screen 60 which consist of a thin film to be described below.

Both the optical input unit 30 and the optical output unit 40 are connected to a networking unit 34. The networking unit 34 comprises a processing unit and a networking card and is adapted and configured to receive information from a communications network 41. The communications network 41 may be the Internet, a telecom network or any other type of local or global network. The information may be video signals comprising moving images, audio signals, as well as data such as e.g. power-point presentation and various other media content. The videoconference system is adapted and configured to collect still or moving images 31 from the local conference space 100 and enable the images 31 to be rendered at a remote site. The videoconference system is also adapted and configured to receive remote still or moving images 32 from a remote site and render it on the optical output unit 40, which is to be described closer below in conjunction with FIG. 2c.

Diagonally through the space sealed by the transparent barrier 38 and the rear wall 39 of the studio runs the screen 60, skewed with an angle α in relation to the optical output unit 40 or the rear wall 39. The screen 60 may consist of film mounted on a frame. The film may be surface foiled polyester film with a very high transparency. Because the film may be made so thin, it is very light, and it does not cause ghost images as would thicker glass mirrors. The screen 60 may be treated so that the angle of refraction is different on each side, so that the surface facing the optical output unit 40 has a wide critical angle and the surface partly facing the transparent barrier 38 and partly the optical input unit 30 has a narrow critical angle. This has the advantage that it maximizes the transmission of the light from the optical output unit 40, and at the same time maximizes the light transmitted in through the barrier 38, which then is reflected into the optical input unit 30.

As mentioned above the screen 60 is skewed slightly with an angle α in relation to the optical output device 40 or the rear wall 39 of the studio. The angle α may be 37 degrees, but will depend on among other things the distance to the conferee staying in the local conference space 100. If α is too small the left-most part of the screen 60 will fall under the critical angle with respect to the conferees and reflect an image that interferes with the transmitted images 32 from the optical output unit 40. Furthermore, a visual feedback loop may occur on the right hand side of the screen 60, with an unwanted image-in-image-in-image. The optical input unit 30 is placed and slanted so that its center of view impinges on the screen 60 under some 45 degree angle. Thereby, a totally reflected image 31 of the local conferee space 100 and anything in it in line of sight may be received by the optical input unit 30. With α less than 37 degrees it is increasingly hard to slant the camera in such a way as to get a straight image. A non-straight image will impair the user experience in terms of eye-contact etc. The part of the screen 60 which can be viewed by the optical input unit 30 and through which the image 32 of a remote space may be seen constitutes a duplexer area 50. Because the screen 60 is skewed less than 45 degrees the x-component of the duplex area 50 is wider than the y-component of the duplex area 50. This gives a sort of optical gearing of the image width which does not distort the image 31 as a wide-angle lens may have done, and which further does not affect the sensitivity for lateral movements.

The screen 60 may, as mentioned above, consist of a transparent film. The film is mounted on some type of frame. The film may be a surface foiled polyester film with a very high transparency. Because the film is made so thin, it is very light, and it does not cause ghost images as would thicker glass mirrors. The film is also virtually unbreakable. Mounting of the film on a sturdy aluminum frame enables a screen size equal to a full size conference studio wall. This size is instrumental in creating a single operational conference setting.

The optical input unit 30 and the optical output unit 40 are adapted and configured to provide a continuous duplex image transfer via a duplexer area 50 provided on the screen 60. The networking unit 34 provides received images 32 to the optical output unit 40. The rendered remote images 32 are visible through the completely transparent protective barrier 38 as mentioned above. In the other direction, reflections from the local conference space 100, i.e. the local image 31, may pass through the transparent barrier 38. The image 31 is then transmitted, i.e. reflected in the surface of the screen 60, due to total reflection. Thus, it is possible for a conferee to see through the screen 60 since it is totally transparent, but the light from the image 31 of the local conference space 100 is reflected to due to the properties of the film making up the screen 60. Eventually the image 31 will reach the aperture of the optical input unit 30, which converts them to a format with may be transmitted electronically to the networking unit 34.

The optical input unit 30 may be a camera placed in such a way that it records the image 31 that is reflected on the screen 60. The differences in placements of the camera 31 have important implications. If the camera would be placed such that the screen is between the local conferee space and the camera, the camera must be placed close to the screen. If this is not done the camera image will also contain disturbing reflections from the screen surface. Such a solution would save studio space, since it would not be necessarily to skew the screen 60. However, this would limit the optical distance from the camera to the local conferee space. As is well known the shorter the optical distance, the more salient is the gaze parallax phenomenon. Thus, it would not be possible to accomplish a natural life-size image with a camera behind the screen.

Placing the optical output unit 40 behind the screen 60 as in the present invention allows the screen 60 to be skewed substantially less than 45 degrees. This is an advantage as it reduces the margin mentioned above and therefore the apparent distance, while the optical distance to the camera is not affected.

Figure 2B:
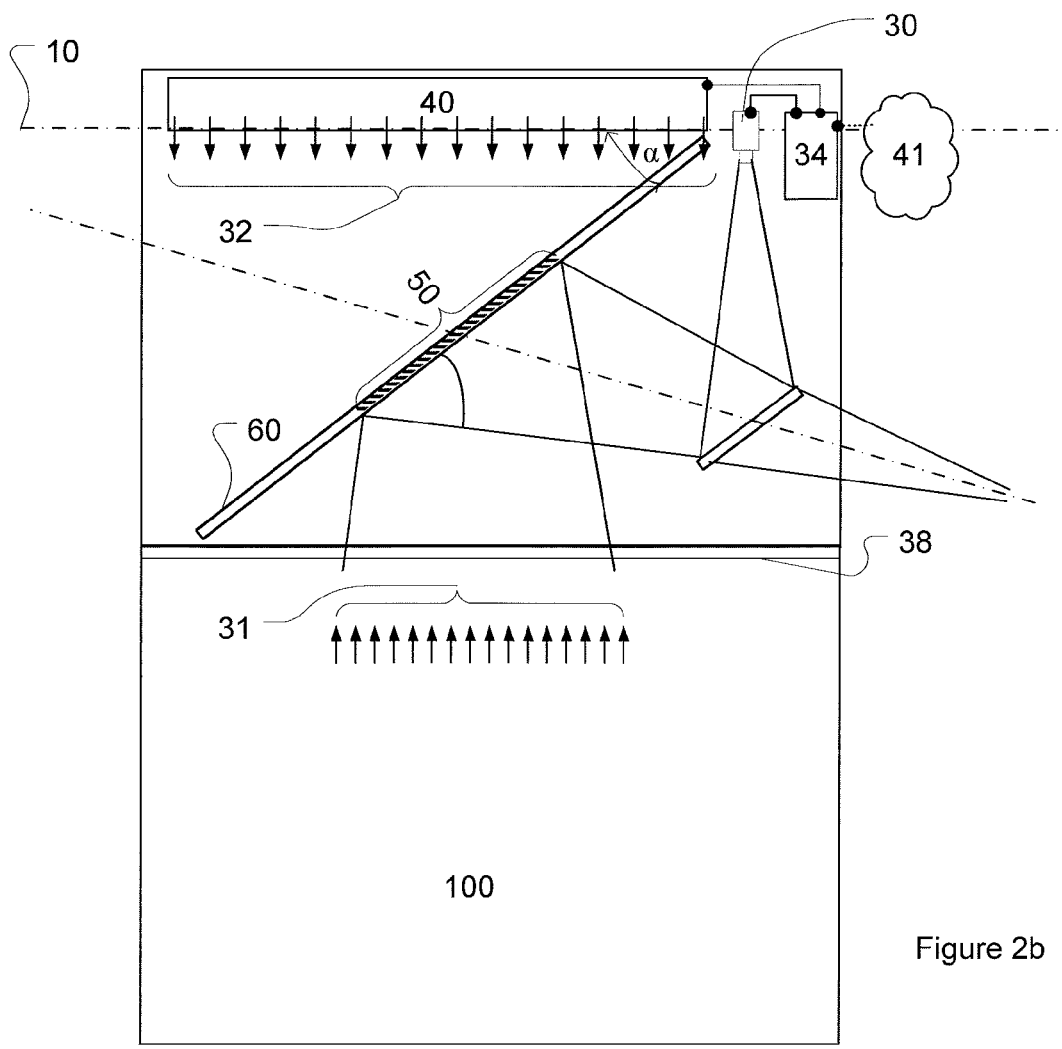
FIG. 2b is a schematic view of a second embodiment, comprising a mirror, of the videoconference system and the local conference space.

FIG. 2b is a schematic view of a second embodiment of the videoconference system and the local conference space. In order to even further eliminate parallax phenomenon the videoconference system is provided with a mirror 65. This embodiment has at least two advantages. Firstly, the optical distance between the camera 30 and the local conference space 100 being imaged in the image 31 may be increased. This in turn makes the beam path straighter, more collimated, and thus the videoconference systems ability to contribute to a studio with true eye contact experience increases. A second advantage is that the image 31 arrives twice mirror-inverted, that is correct, into the camera 30.

In yet another preferred embodiment the camera 30 is provided with an image forming system in form of an inverted telescope through which visible light of objects to be filmed travel to create images. This will further increase the optical distance and further straighten the beam path as is readily understood by a person skilled in the art.

Figure 3A:
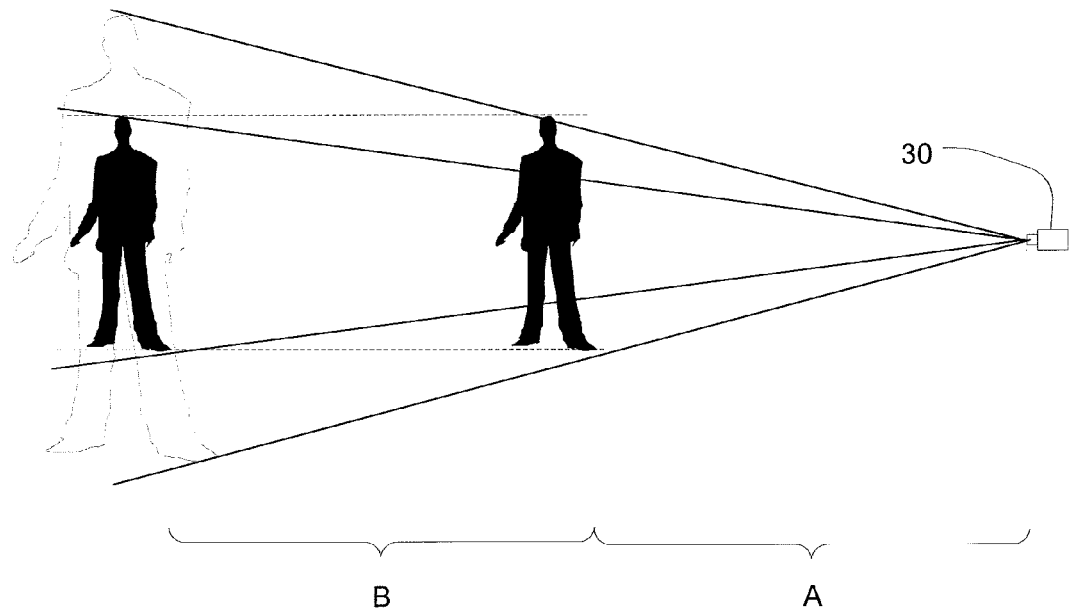
FIG. 3a is a schematic view illustrating the well known parallax effect.
Figure 3B:
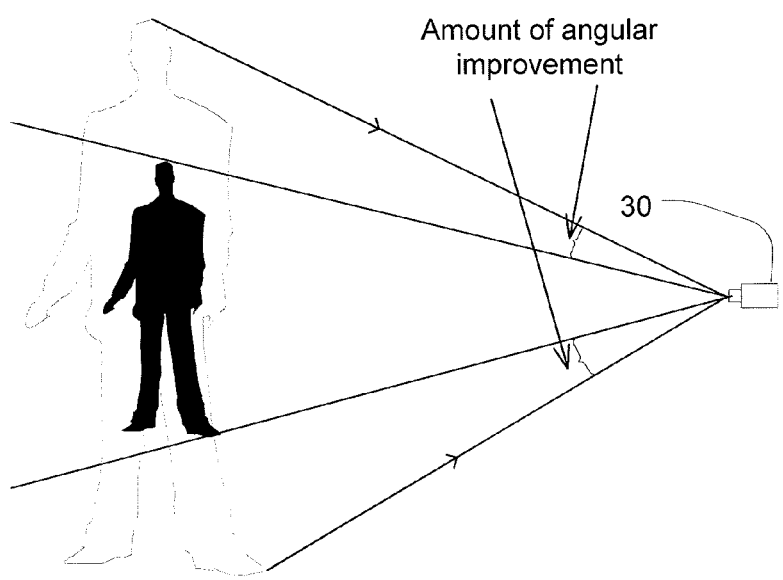
FIG. 3b is a schematic view illustrating the amount of angular improvement that is the effect of the present invention.

This is easy to imagine. Probably all of us have turned a binocular backwards as a child and experienced how far away everything appeared. Thus, by using this principle of an inverted telescope the optical distance is further extended. This principle is illustrated in FIGS. 3a and 3b. In FIG. 3a a conferee is at an actual distance A from the camera 30. A normal camera would see that conferee at the same optical distance. However, by providing the camera 30 with an image forming system in form of an inverted telescope the optical distance will be A+B. Thus, in the mind of the camera the conferee is further away. The amount of angular improvement is best shown by FIG. 3b. As is readily understood by a person skilled in the art the actual amount of improvement is dependent on the image forming system used. It is also believed that it is within the capabilities of a person skilled in the art to design a suitable image forming system in form of an inverted telescope as they are well known in prior art. It should also be understood that the principle of the inverted telescope may be used with all different embodiments of the present invention, i.e. both together with the embodiment in FIG. 2a and the embodiment in FIG. 2b, which also uses a mirror to increase the optical distance.

Thus, the image forming system may be in the form of an inverted refracting telescope, i.e. an inverted telescope that uses lenses to create images. It is also possible to use an inverted telescope in form of an inverted reflecting telescope, i.e. uses mirrors to create images. Also an inverted catadioptric telescope, i.e. a combination of mirrors and lenses may be used to create an image. The use of an inverted optical telescope will decrease the apparent angular size of close objects as well as their apparent brightness. Thus, the images that are created by the image forming system are in most cases very small and also somewhat dark. How small and dark the images will become is decided by the reduction of the image that the image forming system will provide which is readily understood by a person skilled in the art.

In order to improve the image that has been created by the image forming system, the image is sent to the image processing unit, which as mentioned above may be an integrated part of the network unit 34. However, the image processing unit may also be a separate unit that is connected to the camera 30. The image processing unit is configured to enlarge the created images with an amount corresponding to the reduction of the images that the image forming system in form of the inverted telescope has made to the objects that are filmed. There are many enlarging techniques available today and the present invention is not dependable on any special enlarging technique as is readily realized by a person skilled in the art.

In a preferred embodiment of the present invention the image processing means are further configured to enhance the brightness of the created images. Also here there are several known techniques to enhance the brightness of an image that a person skilled in the art may choose from. The object of the brightness enhancement is to create an image that looks as "real" and "natural" as possible.

By using image processing means it is possible to "restore" the images created by the image forming system in form of the inverted telescope. Thus, it is possible to take advantage of the increased optical distance created by the inverted telescope and at the same time remove the adverse effects that the inverted telescope creates in form of smaller and darker images.

Figure 2C:
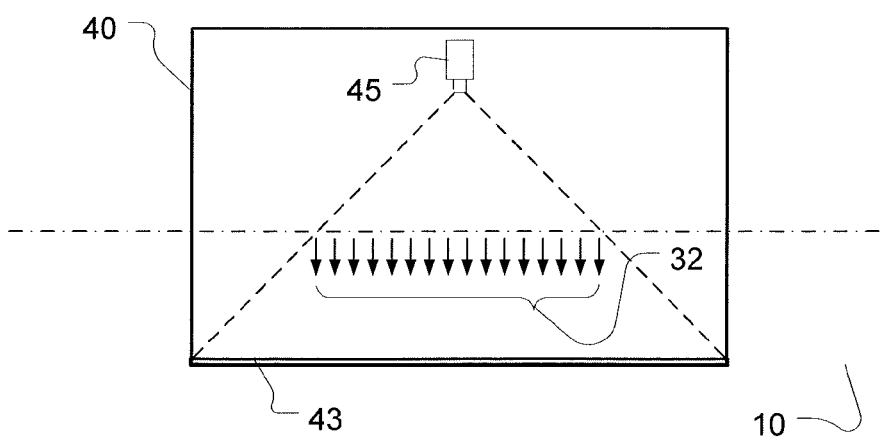
FIG. 2c is a schematic view of the optical output unit according to the present invention.

The optical output unit 40 is closer depicted in FIG. 2c and comprises an image forming unit 45 and an image rendering surface 43, such as for instance a back projection screen 43 and a back projector 45. The optical output unit 40 may alternatively be an LCD unit or a plasma screen unit or some other appropriate image rendering device. The rendering surface 43 of the optical output unit 40 is arranged along an interface surface 10, so that the optical output unit 40 is contained between the interface 10 and the rear wall 39 of the studio and parallel to the interface 10.

The present invention has been described above with relation to a specific video conferencing system which is believed to take great advantage of the image forming system in form of an inverted telescope. However, it should be understood that the camera 30 with the image forming unit in form of the inverted telescope may be used in conjunction with any known or future video conferencing system using camera. Thus, although the present invention has been described with reference to preferred embodiments it should be understood that other embodiments and variations are likewise possible within the scope of the invention, which is best defined by the accompanying claims.

The invention claimed is:

1. A system for life-size videoconferencing provided in a studio having a local conference space, said video conferencing system comprising an optical input unit, an optical output unit and a network unit, wherein the optical input unit is a camera provided with a image forming system in form of an inverted telescope through which visible light of objects to be filmed travel to create images.

2. The videoconferencing system according to claim 1, wherein the network unit further comprises a processing unit for enlarging the created images.

3. The videoconferencing system according to claim 1, wherein the network unit further comprises a processing unit for enhancing the brightness of the created images.

4. The videoconferencing system according to claim 1, further comprising a screen and a transparent barrier, wherein the transparent barrier is arranged to seal and protect the video conferencing system from the local conference space and the screen is provided skewed, with an angle $\alpha$ in relation to the optical output unit, between the transparent barrier and the optical output unit in such a way that it totally reflects the image of the local conference space into the camera and is transparent for a conferee sitting in the local conference space and viewing the optical output unit.

5. The videoconferencing system according to claim 4, wherein the angle $\alpha$ is in the range of 30-45.

6. The videoconferencing system according to claim 1, wherein a mirror is arranged to reflect an image of the local conference space into the camera.

7. The videoconferencing system according to claim 4, wherein the transparent barrier is a surface foiled polyester film.

* * * * *